US000001309H

United States Statutory Invention Registration [19]

[11] Reg. Number: H1309

Allen et al. [43] Published: May 3, 1994

[54] PHOSPHAZENE POLYMER CONTAINING COMPOSITES AND METHOD FOR MAKING PHOSPHAZENE POLYMER CONTAINING COMPOSITES

[75] Inventors: Charles A. Allen; Alan E. Grey, both of Idaho Falls, Id.; Robert R. McCaffrey, Milford, Mass.; Brenda M. Simpson; Mark L. Stone, both of Idaho Falls, Id.

[73] Assignee: The United States of America as represented by the United States Department of Energy, Washington, D.C.

[21] Appl. No.: 559,234

[22] Filed: Jul. 30, 1990

[51] Int. Cl.[5] ..... D03D 3/00

[52] U.S. Cl. ..... 428/224; 428/902; 428/221; 428/447; 528/399

[58] Field of Search ..... 428/408, 902, 224, 221, 428/285, 245, 447; 528/538, 399; 525/168; 427/387, 388.2, 389.7, 393.3

[56] References Cited

U.S. PATENT DOCUMENTS 4,446,191 5/1984 Miyadera et al. ..... 428/285
4,749,489 6/1988 Allen et al. ..... 210/500.28

FOREIGN PATENT DOCUMENTS 2032187 2/1990 Japan .

OTHER PUBLICATIONS

H. R. Allcock, "Phosphorus-Nitrogen Compounds", Academic Press, New York and London, 1972, pp. 337-383.

*Primary Examiner*—Robert L. Stoll
*Assistant Examiner*—Joseph D. Anthony
*Attorney, Agent, or Firm*—James W. Weinberger; Thomas G. Anderson; William R. Moser

[57] ABSTRACT

A composite is produced by first coating a reinforcing material with an inorganic phosphazene compound and then polymerizing the phosphazene compound so as to confer superior thermal, physical and chemical resistance qualities to the composite.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PHOSPHAZENE POLYMER CONTAINING COMPOSITES AND METHOD FOR MAKING PHOSPHAZENE POLYMER CONTAINING COMPOSITES

The U.S. Government has rights in this invention pursuant to Contract No. DE-AC07-76ID01570 between the U.S. Department of Energy and EG&G Idaho, Inc., the operator of the Idaho National Engineering Laboratory.

BACKGROUND OF THE INVENTION

1. Field of the Invention

The present invention relates generally to phosphazene polymer composites and a method for producing phosphazene polymer composites.

2. Background Art

Advances in technology continue to place more demands on existing fabricating materials. Composite matrix materials, comprised of reinforcing materials and organic binding resins, long have been used to provide alternatives to more typical man-made and natural materials. Such organic compounds as high density polyethylene, polypropylene, polycarbonate, polymethylmethacrylate and polystyrene are examples of resins that, when incorporated as binders into composites, provide materials for fabrication in a myriad of applications. However, the tendency of organic polymers to burn readily, soften at moderate temperatures, or swell in contact with organic solvents limits their use in extreme environmental conditions. As such, many organic polymer-containing composites generally lack the thermal, chemical, and biological stability and the radiation resistance needed for widespread application.

A need exists in the art for a composite material to withstand harsh environments, such as those associated with the following exemplary applications:

chemical storage or processing tanks,
pump housings,
insulators,
piping,
motor housings,
circuit boards and circuit breakers,
electrical components,
aerospace applications,
auto (under the hood) components,
transmission components,
brake components,
fuel storage tanks,
heating ducts,
wall paneling, and
light fixtures.

A need also exists to replace harmful products, such as asbestos, with a more durable, yet just as effective material.

Phosphazene polymer materials are stable from approximately 80° C. to 250° C. and, with proper modification, can be made stable up to approximately 500° C. In addition, these polymers are resistant to most organic materials and are stable over a wide pH range. These materials are also resistant to ultraviolet and gamma radiation and biological attack. The general chemical formula for phosphazene is as follows:

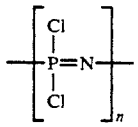

where n is a number greater than 1.

SUMMARY OF THE INVENTION

It is an object of the present invention to provide a composite material which overcomes many of the disadvantages of the prior art.

It is another object of the invention to provide a composite material comprised of phosphazene polymer. A feature of phosphazene-containing composites is their superior stiffness, thermal stability, and hardness which is lacking in more typical composite constituents. An advantage of using phosphazene composites is a wider range of applications for phosphazene composites, including uses in harsh environments.

Another object of the present invention provides a method for producing phosphazene-containing composite materials through a pultrusion process.

In brief, these and other objects are achieved by a composite produced by first coating a reinforcing material with an inorganic phosphazene compound and then polymerizing the phosphazene compound so as to confer superior thermal, physical and chemical resistance qualities to the composite.

A phosphazene-containing composite is provided whereby phosphazene imparts superior thermal, physical and chemical resistance to a reinforcing material.

BRIEF DESCRIPTION OF THE DRAWINGS

The present invention together with the above and other objects and advantages may best be understood from the following detailed description of the embodiment of the invention illustrated in the drawings, wherein.

DETAILED DESCRIPTION OF THE INVENTION

Figure 1:
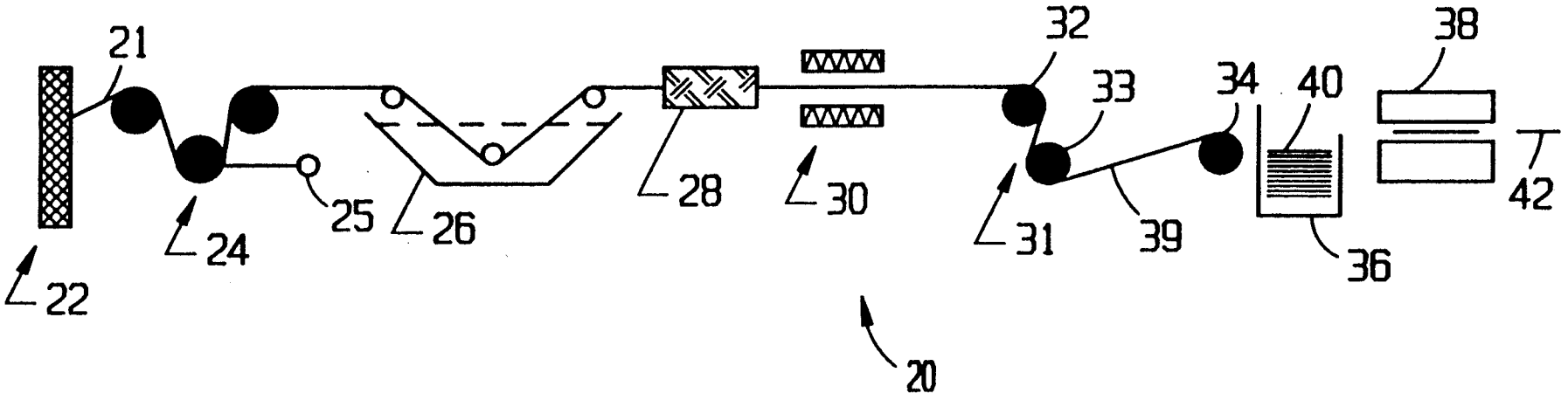
FIG. 1 is a diagram of an exemplary process illustrating the present invention.
Figure 2:
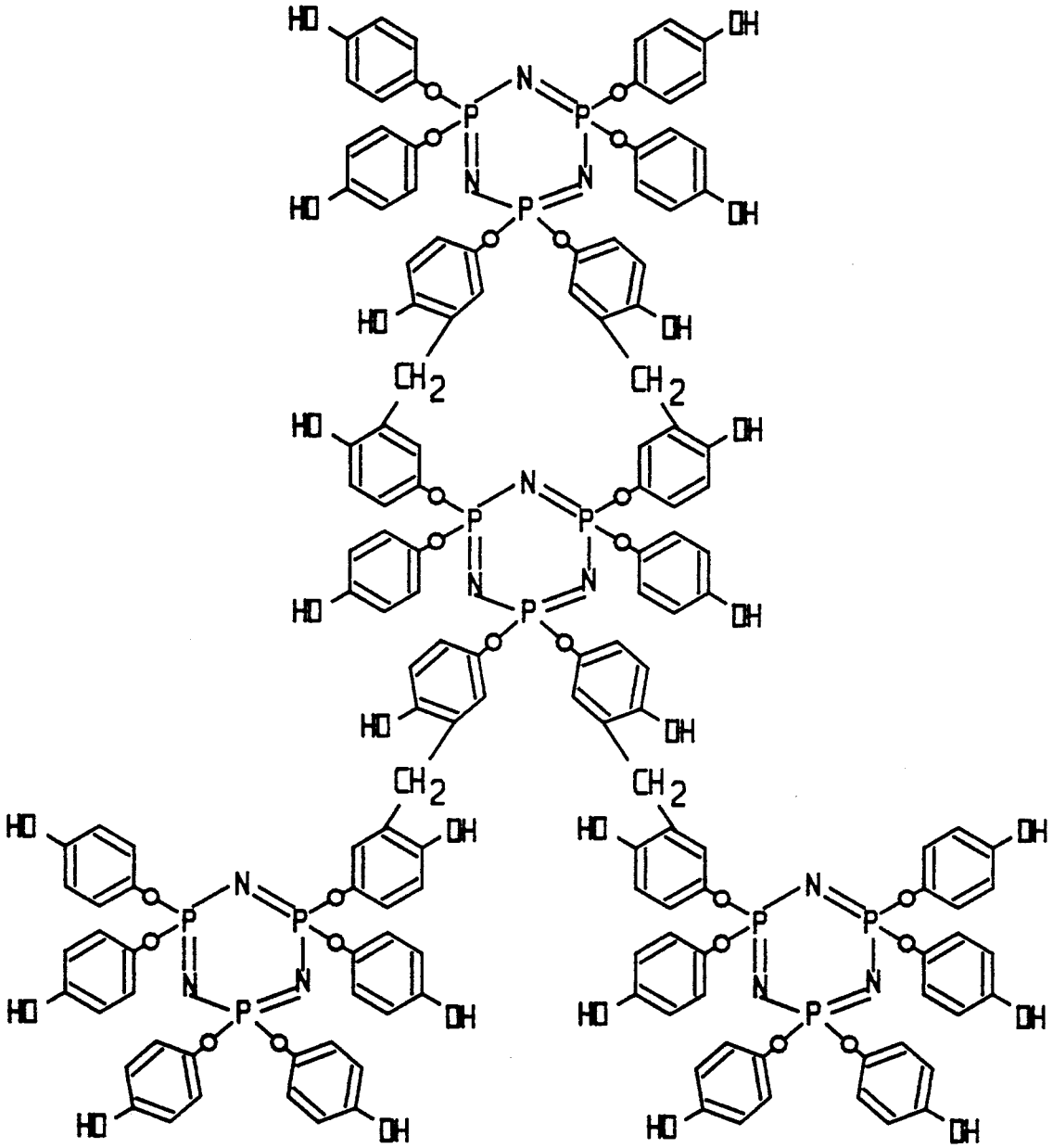
FIG. 2 is the chemical formula for a fiber-coating matrix component of the invention comprising hexa-p-hydroxyphenoxycyclotriphosphazene molecules interconnected by phenol formaldehyde linkages.

Referring to FIG. 1, there is shown a method for producing a composite material of the invention through a pultrusion process generally designated by the reference numeral 20. The pultrusion process 20 combines a reinforcing material 21 with a phosphazene polymer, such as the phosphazene polymer having the chemical formula shown in FIG. 2.

The pultrusion process 20 gets its name from the fact that the reinforcing material 21 is literally pulled through the entire process 20. There are generally nine stages involved in the process 20, namely a spooling-off stage 22, a tensioning system 24, a polymer impregnation bath stage 26, a drying process 28, a shaping stage 30, a puller 31, a take-up spool 34, a sizing stage 36, and a polymerization stage 38. The pultrusion process 20 begins when the reinforcing material 21 is supplied in the spooling-off stage 22. The reinforcing material 21 is then directed into the impregnation bath 26 via the tensioning system 24. A prepolymeric substituted phosphazene molecule dissolved in a suitable solvent mixture is contained in the impregnation bath 26. Constituents of the solvent mixture depend on which substitution groups are attached to the phosphazene molecule; different substitution groups require different reactants and solvents.

After the reinforcing material 21 is pulled through the bath 26, then the coated reinforcing material is dried in the drying process 28 to remove the solvents. Next, the coated reinforcing material 21 is subjected to a shaping stage 30 to form it into a desired configuration in preparation for the sizing stage 36 and the final polymerization stage 38. Upon polymerizing with heat and pressure, the final composite 42 is produced.

Spooling-Off Stage

At the beginning of the pultrusion process 20, the reinforcing material 21 is supplied via the spooling-off stage 22. In the present embodiment, the spooling-off stage 22 is controlled by a small gear, unwinding motor (not shown). The unspooling speed is controlled by the position of a dancer arm 25 in the tensioning system 24 to maintain a smooth and even spool off.

The tensioning system 24 serves to apply the tension to the reinforcing material 21 and to control the speed of the unwinding of the reinforcing material 21. Both of the functions are accomplished simultaneously with the use of a dancer-arm-regulated system. The weight of the dancer arm 25 controls the tension applied to the reinforcing material 21. The dancer arm 25 is also part of an electrical feedback system (not shown) which regulates the speed of spool off. For example, as the dancer arm 25 is raised, the speed of the small gear unwinder motor increases. When the dancer arm 25 is horizontal, the speed of the small gear unwinder motor matches the required speed of the reinforcing material 21 entering the next step of the pultrusion process 20, which is the impregnation bath stage 26.

The major constituent contained in the impregnation bath stage 26 is a prepolymeric phosphazene compound which is produced separately from the pultrusion process 20. This prepolymer coats the reinforcing material 21 during the impregnation bath state 26 and is later polymerized.

Prepolymer Formation

Generation of the prepolymeric substituted phosphazene compound is begun by subjecting a base unsubstituted phosphazene polymer, such as hexachlorocyclotri-phosphazene, which has two chlorine atoms attached to each phosphorous, to a substitution reaction with a difunctional monomer. Generally, suitable difunctional monomers can be selected from alkyl groups, aryl groups, aryloxy groups, alkoxy groups, primary amine groups, secondary amine groups, and mercapto groups. An exemplary list of such difunctional monomers follows:

hydroquinone,
4,4'-sulfonyl diphenol,
1,1,1-Tris(4-hydroxyphenyl)ethane,
3,3-(ethylenedioxy)diphenol,
Allyl alcohol,
4,4'-Isopropylidenediphenol,
2,2'-Methylenediphenol,
4,4'-Biphenol,
2,2'-Biphenol,
Resorcinol and
4,4'-Dihydroxydiphenyl ether.

The reaction effects a linkage at each phosphorous to yield the prepolymeric substituted cyclotriphosphazene molecule having the following general formula:

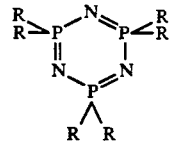

where R represents the moiety formed by a nucleophilic substitution reaction. Such phosphazene polymer substitution reactions are disclosed in U.S. Pat. No. 4,749,489, issued on Jun. 7, 1988, which is incorporated herein by reference. The behavior of reactants on the reactive sites of the trimer are well known in the art and are disclosed in H. R. Allcock, "Phosphorous-Nitrogen Compounds-Cyclic, Linear, and High Polymeric Systems," Academic Press, New York 1972, Chapter 16.

In the case of using p-hydroquinone as the difunctional monomer, reaction with hexachlorotriphosphazene will result in two phenoxy substitutions at each phosphorous to yield the prepolymeric substituted cyclotriphosphazene, hexa-p-hydroxyphenoxycyclotriphosphazene. Hexa-p-hydroxyphenoxycyclotriphosphazene has the following chemical formula:

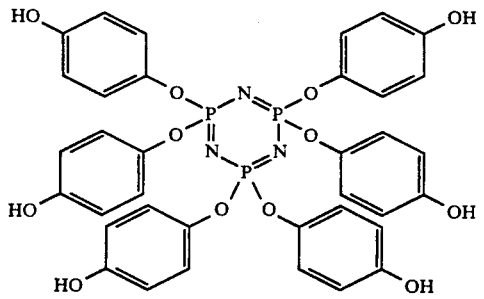

As described in U.S. Pat. No. 4,749,489, three phosphazene molecule configurations are available, namely linear-, cyclolinear- and cyclomatrix-phosphazene polymers. Cyclomatrix or rigid polymers of phosphazene are hard thermosetting resins having limited solubility that can be employed to produce rigid composite structures having thermal stability up to approximately 500° C. Composites incorporating cyclomatrix polymers exhibit superior resistance to acids and bases and to all solvents when cured.

If more flexible composites are desired, the linear or ductile phosphazene polymers can be used. These flexible thermoplastic elastomers produce composites that exhibit a useful temperature range of 80° C. to 250° C. while exhibiting selected solubilities to various solvents. These more ductile composites exhibit good resistance to bases and some acids and most solvents. Good resistance is displayed to ketones, alcohols, and aliphatic hydrocarbons.

A combination of rigid and elastic properties can be achieved by incorporating cyclolinear phosphazene molecules as the flexible thermoplastic elastomers or thermoplastic resins required to provide semi-rigid composite structures having thermal integrity up to 350° C.

Ultimately, the phosphazene-to-difunctional monomer mole ratio is 6-to-1, as it is sought that all six chlorine atoms be removed from each unsubstituted phosphazene molecule.

The laboratory synthesis of the hydroquinone prepolymer was performed as follows:

All of the glassware is dried in an oven at 120° C. and cooled before use under an argon atmosphere. In a nitrogen-purged glove bag, a 3-liter, three-necked, round-bottom flask is charged with 224 grams of hydroquinone and 120 grams of phosphonitrilic chloride trimer. The necks are plugged with rubber septa before the flask is removed from the bag. With argon flowing through the apparatus, the flask is fitted with a reflux condenser topped with a gas inlet, a 300 ml pressure-equalizing addition funnel, and a glass-clad thermocouple.

First, 800 ml of anhydrous cyclohexane is transferred into the flask via the addition funnel, followed by 200 ml of anhydrous pyridine. Cold tap water is run through the reflux condenser; the gas inlet is connected to an argon bubbler to maintain atmospheric pressure within the apparatus. The contents of the flask are warmed to 50° C. to facilitate dissolution of the hydroquinone and phosphonitrilic chloride timer and thereby allowing the mixture to be stirred. The mixture is then heated to reflux, which occurs at 76° C. Upon the reaction mixture reaching reflux, a modern exotherm commences and continues for a few minutes. The mixture is kept refluxing overnight under an argon atmosphere and then allowed to cool. At this point, the contents of the flask are not sensitive to moisture and so can be handled in air: the hydroquinone prepolymer is hydrolytically stable, as contrasted to the phosphonitrilic chloride trimer.

Isolation and purification of the hydroquinone prepolymer are effected by dissolving the amber solid in 500 ml of hot 80 percent acetic acid. After the light amber solution is allowed to cool to room temperature, it is added to 20 liters of deionized water, resulting in the precipitation of the hydroquinone prepolymer as a white solid. The mixture is stirred for 30–45 minutes to allow for digestion of the precipitate. The white solid is collected by filtration and then redissolved and reprecipitated in the same fashion. The white solid collected by filtration is then washed with pH-neutral water until the rinsate is neutral. The washing can be performed either on the filter, yielding a white powder, or using a Soxhlet extractor, yielding an off-white, compressed mass. The solid is then dried by gentle warming; a period of three to four days can be necessary to drive off all of the entrapped water, and no color change is observed during this time. The resultant dry mass typically weighs 130 grams for a yield of about 70 percent, based on the amount of phosphonitrilic chloride starting material.

The identity of the product is confirmed by comparison of $^{1}H$, $^{13}C$, and $^{31}P$ NMR spectra with those of a known sample.

Impregnation Bath Stage

It is the polymer impregnation bath stage 26 where the prepolymer, formulated in the above process, is applied to the reinforcing material 21. The purpose of the impregnation bath stage 26 is to coat the reinforcing material 21 with the prepolymeric substituted phosphazene compound in preparation for the subsequent polymerization stage 38, whereby the prepolymeric substituted phosphazene molecules are polymerized or linked together.

The preparation of the impregnation liquor in the impregnation bath stage 26 is dependant upon the type of difunctional monomer chosen in the substitution reaction with the base, unsubstituted, phosphazene polymer hexachlorocyclotriphosphazene. If a diol, such as hydroquinone, is substituted at the phosphorous sites, then linking of adjacent phosphazene molecules will have to be facilitated by exposing the ring to a nucleophilic carbon, such as that found on formaldehyde. The formaldehyde, then, or some other carbonyl carbon source, would have to be supplied sometime before or during the polymerization process. A number of suitable compounds, such as a hexamethylenetetramine, formalin and paraformaldehyde, can serve as the needed cross linking agent. Alternatively, such reactions are not necessary if difunctional monomers are selected which have allylic carbons or other electrophilic centers. Such monomers include allyl alcohol, hexamethylenediamine and the glycols.

Accordingly, if p-hydroquinone is used as the difunctional monomer, the resulting prepolymer hexa-p-hydroxyphenoxycyclotriphosphazene, formulated in the above process, is then dissolved in a suitable solvent, in approximately a 2 to 1 mole ratio with hexamethylenetetramine. The hexamethylenetetramine is presented in a water-acetone mixture. The pressure of this reaction is maintained at 1 atmosphere. The resulting solution comprises the impregnation bath used to treat the reinforcement component of the composite. Aside from a solution, the prepolymer can also be applied as a fine powder or a liquid melt. Regardless of the process used, a desired weight percent fiber to resin mixture is 60%, plus or minus 5%.

A myriad of types of reinforcing material, including glass, oxynitride glass fibers, or carbon, such as graphite, which are typically supplied in fiberous ribbon-like or tape-like configurations, can be pulled through the impregnation bath. Any fiber thickness can be used. AS-4-12K Magnamite, by Hercules, is one example of a suitable graphite fiber type. Good results have been achieved at tape thicknesses ranging from 0.15 millimeters (mm) to 0.20 mm. The weight percent of reinforcing material 21 to total composite weight will vary, from 50 percent to 80 percent depending on the use of the final composite structure 42. The amount of impregnation of the reinforcing material 21 by the polymer depends on how long the reinforcing material 21 is immersed in the impregnation bath 26. Exposure times can vary, from approximately 0.25 minutes to 3 minutes. Good composites are produced when graphite fibers comprise 60 weight percent, plus or minus 5 percent of the final composite. This weight ratio is achieved when the graphite is immersed in the impregnation bath 26 of the proper concentration for approximately 30 seconds at 1 atm at room temperature.

Drying and Shaping Stages

In both a slurry and solution type of impregnation of the reinforcing material 21, the solvent, for example, acetone, must be removed by heating the newly formulated composite mixture at approximately 40° C.–60° C., at the drying process stage 28. The drying process stage 28 can be any workable system, including, for example, such as an oven, a heated stream of air or a stream of hot inert gas. A stream of hot nitrogen ranging in temperature from 42° C. to 52° C. has been employed.

Usually, it is desirable to shape the reinforcing material 21 into a shaped reinforcing material 39 that is easily handled. Any suitable system for the shaping stage 30 can be employed, for example, such as, a system of flat bars, dies or rollers to flatten the fiber-matrix composite.

The shaped reinforcing material 39 is pulled through the pultrusion process 20 by the puller 31 and take-up means 34. For example, the puller 31 can include a high torque, 100 in/oz, low speed 1.9 RPM motor for pulling the reinforcing material 21 through the process 20. The puller 31 can be an "S" type of puller arrangement as shown in FIG. 1 in which a spool 33 is free wheeling and the take-up spool 34 is attached to a separate puller motor (not shown) to wind up the shaped reinforcing material 39. Alternatively, the puller 31 can consist of the spools 32 and 34 with spool 32 adapted to wind the shaped reinforcing material 39 directly on the spool 34.

The shaped reinforcing material 39 is then removed from the take-up spool 34 and cut or otherwise configured into a sized reinforcing material 40 at the sizing stage 36 in preparation for the polymerization stage 38.

Polymerization Stage

The polymerization stage 38 subjects the shaped reinforcing material 39 to heat and pressure. Heat and pressure are necessary to drive the polymerization reaction. Typically, a temperature of approximately 150° C. to 220° C. is employed. Using graphite fibers and cyclomatrix phosphazene polymers, applying heat for 5 minutes at contact pressure and for an additional 25 minutes at 5,000 psi produces a good rigid composite matrix as the resulting composite 42. If more flexible composites are desired, a blend of cyclomatrix and linear phosphazene polymers can be used. Generally, pressures can range from 100 psi to 5,000 psi.

The polymerization stage 38 is the final step in producing the composite product 42.

Polyphosphazene Moduli

Many polyphosphazene samples formulated by the prepolymer fabrication process outlined above have been tested for their mechanical and flexural properties. Accordingly, Table 1, below, shows the densities and percent open porosity of samples of polyphosphazene bars, and Table 2, below, shows the breaking strength and elasticity properties of phosphazene materials. The numbers in the column labelled Sample represent the identification number of the specific samples tested. The GPa designation represents gigaPascals and psi represents pounds per square inch.

Various moduli properties are also listed in Table 2. Shear modulus indicates the ratio of the shearing stress divided by the corresponding shear. Young's modulus is defined as the force in dynes per square centimeter (dynes/cm$^2$) to permanently deform a material by stretching, twisting or bending it. The deformation defined in the Young's Moduli standard is represented generally by the formula FL/al where F is the whole force, a the area, L. the entire length of the wire or substrate, and l the extension. Bulk modulus is the approximate value in dynes/cm$^2$ between the limit of elasticity and the breaking strength of a material.

TABLE 1

DENSITIES AND PERCENT OPEN POROSITY OF POLYPHOSPHAZENE BARS

| Sample | Density (g/cm$^3$) | Open Porosity (%) |
|---|---|---|
| 139-1 | 1.441 | 0.0653 |
| 132-1 | 1.440 | 0.0784 |
| 131-2 | 1.439 | 0.0845 |
| 137-2 | 1.440 | 0.0633 |

TABLE 2

MECHANICAL PROPERTIES OF POLYPHOSPHAZENE BARS

| | Shear Modulus | | Young's Modulus | | Poisson's | Bulk Modulus | |
|---|---|---|---|---|---|---|---|
| Sample | GPa | (psi) | GPa | (psi) | Ratio | GPa | (psi) |
| 139-1 | 2.74 | (400040) | 7.44 | (1086240) | 0.356 | 8.63 | (1,259,980) |
| 132-1 | 2.74 | (400040) | 7.44 | (1086240) | 0.356 | 8.62 | (1,258,520) |
| 131-2 | 2.74 | (400040) | 7.44 | (1086240) | 0.357 | 8.70 | (1,270,200) |
| 137-2 | 2.72 | (397120) | 7.39 | (1078940) | 0.356 | 8.57 | (1,251,220) |
| 131-1 | 2.76 | (402960) | 7.50 | (1095000) | 0.358 | 8.81 | (1,286,260) |

Phosphazene polymer, formulated by the above prepolymer fabrication process, also displays superior surface characteristics compared to composites formulated with organic resins. Table 3 below depicts polyphosphazene material as having superior Rockwell Hardness characteristics compared to composite material fabricated with organic resins. The various composites, designated as "PET-glass", "PPO-glass", "PC-glass", and "ABS-glass" represent polyethyleneterephalate-glass, polyphenyleneoxide-glass, polycarbonate-glass and acrylonitrilebutadienestyrene-glass composites, respectively. The Rockwell Hardness of a substance is a measure of its relative hardness, based on the indentation made by a 1/16", ⅛" or ¼" standard steel ball or a conical diamond with an apex angle of 120 degrees. Results are reported by using numbers to denote the pressure applied in kilograms, and letters are used to denote the ball or diamond producing the indentation. Accordingly, phosphazene bars withstand in excess of 120 kilograms of pressure applied by the M indentation standard, which is a ¼ inch diameter steel ball.

Phosphazene bars also exhibit superior stiffness properties, as shown in Table 4, below. A comparison of the Young's Moduli properties of phosphazene bars with typical composites shows the relatively superior stiffness qualities of the invention.

TABLE 3

ROCKWELL HARDNESS OF POLYPHOSPHAZENE AND VARIOUS COMPOSITES

| Sample | Indentation Pressure (Kgs. M Scale) |
|---|---|
| Polyphosphazene | 120–130 |
| PET-glass | 80–100 |
| Polyamides-glass | 90–100 |
| PPO-glass | 90–97 |
| PC-glass | 80–90 |
| ABS-glass | 70–80 |

TABLE 4

COMPARISON OF YOUNGS'S MODULI OF POLYPHOSPHAZENE WITH VARIOUS ENGINEERING PLASTICS

| Sample | GPa | $10^6$ psi |
|---|---|---|
| Polyphosphazene | 7.4 | 1.07 |
| Phenolic | 5.5 | 0.78 |

TABLE 4-continued

COMPARISON OF YOUNGS'S MODULI OF POLYPHOSPHAZENE WITH VARIOUS ENGINEERING PLASTICS

| Sample | GPa | $10^6$ psi |
|---|---|---|
| Polystyrene | 3.4 | 0.48 |
| Polymethylmethacrylate | 2.8 | 0.41 |
| Polycarbonate | 2.4 | 0.35 |
| Polypropylene | 1.4 | 0.20 |
| High Density Polyethylene | 0.8 | 0.10 |

Relative Properties

The resulting composite 42 exhibits unexpectedly superior qualities of hardness and elasticity. Table 5 depicts the flexural strength of phosphazene materials in monolithic form, for example, without reinforcement material, as well as phosphazene composite materials using carbon fiber and woven glass mat. The width and thickness of the samples are shown, as is the breaking point , designated as Break Pt, where the bar broke at the indicated pressure (given in pounds). The flexural strength of the materials is given in MPa and psi. Table 6 compares the flexural strength of a phosphazene-containing composite with more typical composite materials.

TABLE 5

FLEXURAL STRENGTH OF MONOLITHIC PHOSPHAZENE AND PHOSPHAZENE-CONTAINING COMPOSITES

| Sample | Width (mm) | Thickness (mm) | Break Pt (lbs) | Strength MPa | PSI |
|---|---|---|---|---|---|
| Polyphosphazene Monolithic Bars. | | | | | |
| −115-2 | 12.71 | 2.74 | 40.50 | 56.64 | 8214.57 |
| −115-3 | 12.69 | 2.74 | 66.50 | 93.15 | 13509.38 |
| −116-2 | 12.60 | 2.80 | 43.80 | 59.17 | 8581.51 |
| −116-3 | 12.67 | 2.82 | 61.80 | 81.85 | 11871.08 |
| −122-1 | 12.75 | 2.81 | 19.00 | 25.19 | 3652.64 |
| −123-1 | 12.73 | 2.81 | 56.80 | 75.41 | 10936.63 |
| −127-3 | 12.68 | 2.82 | 63.00 | 83.38 | 12092.04 |
| −127-1 | 12.73 | 2.82 | 87.60 | 115.48 | 16747.65 |
| 1743-28I | 12.66 | 2.80 | 16.60 | 22.32 | 3236.94 |
| −291 | 12.64 | 2.80 | 61.00 | 82.15 | 11913.60 |
| −29-2 | 12.65 | 2.83 | 52.00 | 68.49 | 9933.82 |
| Polyphosphazene Carbon Fiber Composites. | | | | | |
| −114-2 | 12.70 | 2.80 | 692.00 | 927.48 | 134512.53 |
| −114-3 | 12.53 | 2.81 | 665.00 | 896.97 | 130087.14 |
| −117-2 | 12.68 | 2.82 | 723.00 | 956.84 | 138770.53 |
| −117-3 | 12.68 | 2.78 | 624.00 | 849.76 | 123240.14 |
| −118-1 | 12.74 | 2.79 | 598.00 | 804.71 | 116707.77 |
| −123-2 | 12.72 | 2.74 | 673.00 | 940.47 | 136396.51 |
| −123-3 | 12.82 | 2.78 | 329.00 | 443.14 | 64267.99 |
| −124-1 | 12.75 | 2.79 | 361.00 | 485.41 | 70398.76 |
| −124-3 | 12.78 | 2.78 | 385.50 | 520.86 | 75540.59 |
| −124-4 | 12.81 | 2.74 | 476.00 | 660.50 | 95792.86 |
| −125-1 | 12.76 | 2.81 | 717.00 | 949.67 | 137731.18 |
| −131-2 | 12.77 | 2.80 | 289.00 | 385.22 | 55868.54 |
| −129-2 | 12.75 | 2.56 | 619.00 | 988.60 | 143376.16 |
| −129-3 | 12.77 | 2.55 | 465.00 | 747.31 | 108382.24 |
| −131-3 | 12.76 | 2.74 | 357.50 | 498.02 | 72227.18 |
| −132-1 | 12.73 | 2.68 | 488.00 | 712.26 | 103299.51 |
| −134-2 | 12.77 | 2.62 | 410.50 | 624.94 | 90635.03 |
| −135-1 | 12.63 | 2.62 | 384.00 | 591.08 | 85723.86 |
| Polyphosphazene Glass Mat Composites. | | | | | |
| −89-2 | 12.74 | 2.81 | 210.00 | 278.58 | 40403.00 |
| −90-1 | 12.75 | 2.79 | 280.00 | 376.49 | 54602.92 |
| −100-3 | 12.77 | 2.78 | 166.50 | 225.14 | 32652.03 |
| 102-1 | 12.78 | 2.80 | 96.00 | 127.86 | 18543.89 |
| 102-2 | 12.76 | 2.82 | 112.00 | 147.29 | 21362.18 |
| −102-3 | 12.75 | 2.79 | 261.00 | 350.95 | 50897.72 |
| −132-2 | 12.77 | 2.80 | 147.00 | 195.94 | 28417.56 |

TABLE 6

FLEXURAL STRENGTH OF A PHOSPHAZENE COMPOSITE AND VARIOUS OTHER COMPOSITES

| Sample | $10^3$ psi |
|---|---|
| Phosphazene-Carbon fiber | 194.97 |
| Polyphenylene sulfide-Carbon fiber | 198.00 |
| Epoxy-Scotchply | 184.00 |
| Amine epoxy-Graphite fiber | 260.00 |

While the invention has been described with reference to details of the illustrated embodiment, these details are not intended to limit the scope of the invention as defined in the appended claims.

The embodiment of the invention in which an exclusive property or privilege is claimed is defined as follows:

1. A composite material comprising:

a single constituent fibrous reinforcing material; and a phosphazene compound; said phosphazene compound coating said single constituent fibrous reinforcing material to form the composite material whereby to impart predetermined thermal, physical and chemical resistance to the composite material.

2. A composite material as recited in claim 1 wherein the single constituent fibrous reinforcing material is selected from the group consisting of glass, carbon, and oxynitride fibers.

3. A composite material as recited in claim 1 wherein the phosphazene compound is selected from the group consisting of linear polyphosphazene, cyclolinear polyphosphazene, cyclomatrix polyphosphazene, and combinations thereof.

4. A composite material as recited in claim 1 wherein the phosphazene compound has the chemical formula:

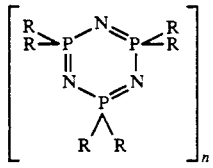

where R is a difunctional side group selected from the group consisting of alkyl groups, aryl groups, aryloxy groups, alkoxy groups, primary amine groups, secondary amine groups, mercapto groups, and combinations thereof; and n is an integer greater than 1.

5. A composite material as recited in claim 1 wherein the composite material contains between 50 and 80 percent by weight of single constituent reinforcing fibrous material to the total weight of the composite material.

6. A composite material as recited in claim 1 wherein the composite material contains between 55 percent and 65 percent by weight of single constituent fibrous reinforcing material to total weight of the composite material.

7. A composite material comprising:

a graphite fiber; and hexa-p-hydroxyphenoxycyclotriphosphazene; said hexa-p-hydroxyphenoxycyclotriphosphazene coating said graphite fiber to form the composite material whereby to impart predetermined thermal, physical and chemical resistance to the resulting composite material, and said graphite fiber comprises 55 weight percent to 70 weight percent of the composite material.

* * * * *